US006766243B1

(12) United States Patent
Haussmann et al.

(10) Patent No.: US 6,766,243 B1
(45) Date of Patent: Jul. 20, 2004

(54) DEVICE AND METHOD FOR IGNITION IN AN INTERNAL COMBUSTION ENGINE

(75) Inventors: Martin Haussmann, Sachsenheim (DE); Joachim Heimes, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 10/110,185

(22) PCT Filed: Sep. 27, 2000

(86) PCT No.: PCT/DE00/03395

§ 371 (c)(1),
(2), (4) Date: Jul. 31, 2002

(87) PCT Pub. No.: WO01/25625

PCT Pub. Date: Apr. 12, 2001

(30) Foreign Application Priority Data

Oct. 6, 1999 (DE) ........................................ 199 48 193
Nov. 24, 1999 (DE) ........................................ 199 56 381

(51) Int. Cl.[7] ................................................ G06F 19/00

(52) U.S. Cl. ....................... 701/114; 324/380; 701/111; 123/339.11; 123/406.11; 123/406.57

(58) Field of Search ................................ 701/114, 111; 123/287, 305, 329, 334, 339.11, 406.11, 406.57; 324/380, 384, 391, 402

(56) References Cited

U.S. PATENT DOCUMENTS 4,892,073 A * 1/1990 Yamamoto et al. .... 123/406.14
5,208,540 A 5/1993 Hoeflich ..................... 324/388
5,283,527 A 2/1994 DeBiasi ....................... 324/391
5,334,938 A * 8/1994 Kugler et al. ............... 324/399
5,387,870 A 2/1995 Knapp et al. ............... 324/379
5,444,375 A 8/1995 Ohsawa et al. ............. 324/380
5,584,275 A * 12/1996 Taruya .................. 123/406.14
6,359,439 B1 * 3/2002 Crecelius et al. ........... 324/391

FOREIGN PATENT DOCUMENTS

DE 41 40 147 6/1993
EP 0 020 069 12/1980
EP 0 344 394 12/1989

* cited by examiner

*Primary Examiner*—Willis R. Wolfe
*Assistant Examiner*—Johnny H. Hoang
(74) *Attorney, Agent, or Firm*—Kenyon & Kenyon

(57) ABSTRACT

In a device and a method for ignition of an internal combustion engine having at least one cylinder is described, the device includes a central control unit and peripheral units, each being allocated to one cylinder, digital control signals being sent from the central control unit to the peripheral units, triggering the peripheral units to ignition of the respective cylinder, measured values describing states in the peripheral units being determined by the peripheral units and sent to the central control unit as a function of the measured values, at least one time difference between the control signals and the diagnostic signals being determined by the central control unit for analysis of the diagnostic signals.

31 Claims, 12 Drawing Sheets

DEVICE AND METHOD FOR IGNITION IN AN INTERNAL COMBUSTION ENGINE

FIELD OF THE INVENTION

The present invention relates to a device and a method for ignition of an internal combustion engine.

BACKGROUND INFORMATION

European Published Patent Application No. 0 344 394 describes a device and a method for ignition of an internal combustion engine. The device includes a circuit analyzing the primary voltage characteristic of an ignition coil as a function of time, but also requires an additional component. By comparison with a reference primary voltage characteristic, it is possible to detect when the primary voltage amplitude drops below a defined amplitude before a defined period of time has elapsed. This case is interpreted as misfiring.

German Published Patent Application No. 41 40 147 describes the characteristic of the secondary voltage or the operating voltage transformed to the primary side is detected by a sensor, and when ignition is correct, the signal applied to a diagnostic line is switched from 1 to 0 (or alternatively from 0 to 1). Cylinder-selective detection of faulty ignition is thus possible.

European Published Patent Application No. 0 020 069 describes a device in which the primary voltage characteristic is monitored so that the time difference during which the primary voltage exceeds a certain selected value is compared with a selected time difference. Misfiring is detected if the primary voltage remains above the given level for a time difference which is greater than the selected time difference.

SUMMARY

The device and the method according to the present invention may provide the advantage that the characteristics of variables of the primary or secondary circuit are monitored by using threshold values. If values exceed or drop below the selected threshold values, a digital diagnostic line generates a signal edge which is analyzed in a microprocessor. The signal edges relayed via the diagnostic line permit an analysis of periods of time during which certain ignition states prevail. Given a suitable selection of threshold values, this analysis allows differentiation between various causes of misfiring, which thus makes it easier to identify and eliminate these causes. Another advantage is that the implementation of the device according to the present invention in terms of circuitry may require no additional component for ignition diagnosis.

The diagnostic signals of several variables such as the primary current and primary voltage as well as the diagnostic signals of several cylinders may be carried over one diagnostic bus line, taking into account the chronological order, and linked via a logic operations block or an open-collector circuit.

The time counter unit and a part of the arithmetic unit of the microprocessor may be accommodated in a time processing unit, which is arranged separately from the microcomputer and is coupled to it. Comparisons of signals with a continuous timer performed by the time processing unit do not thereby burden the capacity of the microcomputer.

It may be advantageous to investigate whether the measured periods of time are within setpoint intervals, because the operating parameters of the internal combustion engine are subject to certain fluctuations which allow the setpoint values to fluctuate within certain limits even with correct ignition. The limits of the setpoint intervals may be determined on the basis of model assumptions as a function of operating parameters of the internal combustion engine and to store them in the memory unit of the microcomputer. This storage may also take place during the application. The setpoint intervals are then read out of the memory unit for the respective comparison to be performed as a function of the corresponding operating parameters of the internal combustion engine. The battery voltage may be selected as an operating parameter. Another advantageous improvement may be achieved by determining the respective setpoint intervals on the basis of the measured time difference values by using statistical methods during the operation of the internal combustion engine. For certain applications, it may be advantageous to compare the measured time difference with a setpoint value. It may be advantageous to form a ratio of the measured time difference to the corresponding time difference of the preceding combustion cycle in the same cylinder. The ratio is then checked for a deviation from a ratio of 1. Fluctuations in temperature and battery voltage have hardly any effect on this ratio due to the small time interval between two combustion cycles. When analyzing the times, it may be possible to differentiate the cylinder-specific times on the basis of the activation signals, and thus a cylinder-specific fault analysis may be performed. The fault may be subsequently stored in the memory unit of the microcomputer with a reference to the respective cylinder, or output on a display unit, or cylinder-specific emergency measures may be taken.

When a certain selected first threshold value of a primary current is exceeded, a first signal edge, known as the first charging signal edge, may be generated in the respective diagnostic line, and in the case of a shutoff signal edge in the activation signal, a second signal edge, known as the second charging signal edge, may be generated in the respective diagnostic line.

In addition, it may also be advantageous to generate a second signal edge, the second excess temperature shutdown (ÜFTA) signal edge, in the respective diagnostic line when an excess temperature shutdown of the controllable switch is detected. This yields the possibility of determining the starting time as a time difference between an activation edge in the activation signal of the respective cylinder and the first charging signal edge and to check on whether the starting time is within a first setpoint interval. Given a suitable choice of the first threshold value, it is possible to determine whether there is a short circuit to the battery voltage or a turn-to-turn fault in the ignition coil. The time between the first charging signal edge and the second charging signal edge may be determined as the-charging time, and a check may be performed to determine whether the charging time is within a second setpoint interval. It is possible to determine from this whether there is a loose contact in the peripheral unit or a fault in the microcomputer or the time processing unit. When a second excess temperature shutoff signal edge occurs before the second charging signal edge, the time difference between the first charging signal edge and the second excess temperature shutoff signal edge may be interpreted as charging time. Thus, it may also be possible to detect the occurrence of an excess temperature shutdown over the diagnostic line.

It may also be advantageous to generate a first signal edge, the first voltage signal edge, in the diagnostic line when the primary voltage exceeds a second threshold value and to generate a second signal edge, the second voltage signal edge, when the primary voltage falls below a third threshold value.

It may be advantageous to determine a rise time from the time difference between the shutoff signal edge of the activation signal and the first voltage signal edge. A rise time may be determined from the time difference between the shutoff signal edge of the activation signal and the first voltage signal edge, and an ignition time may be determined from the first voltage signal edge and the second voltage signal edge, in which case ignition may be interpreted as not having occurred if the rise time thus determined falls below a third setpoint value and if the ignition time exceeds a fourth setpoint value.

DETAILED DESCRIPTION

Figure 1A:
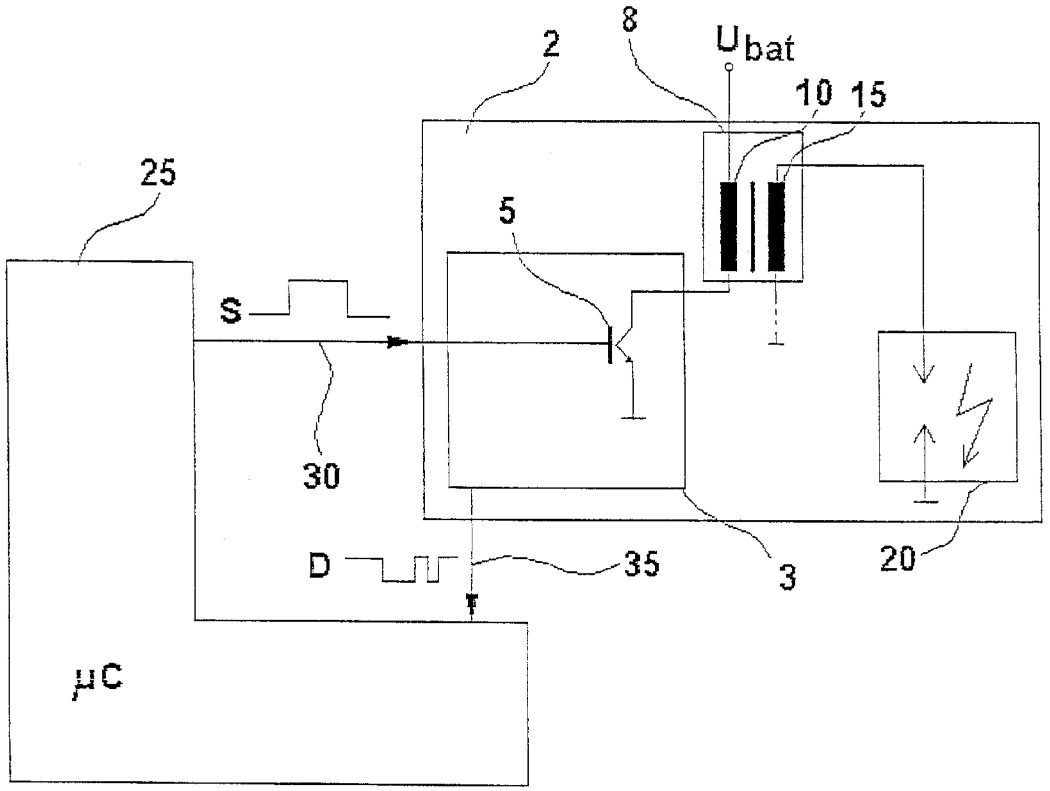
FIGS. 1*a*, 1*b*, 1*c* and 1*d* are schematic views of example embodiments of a device for ignition of an internal combustion engine according to the present invention.

FIG. 1*a* illustrates a device according to the present invention for ignition of an internal combustion engine, illustrating schematically a peripheral unit 2 for a cylinder of an internal combustion engine having an ignition output stage 3, an ignition coil 8, which has a primary winding 10 and a secondary winding 15, and a spark plug 20. The first end of secondary winding 15 is connected in series with the first electrode of spark plug 20. The second electrode of spark plug 20 and the second end of secondary winding 15 are connected to the internal combustion engine reference potential. Controllable switch 5, e.g., configured as a power transistor, is included in the ignition output stage 3. The collector of the power transistor is connected in series with the first end of primary winding 10 of ignition coil 8, while the emitter of controllable switch 5 is connected to the reference potential. The second end of the primary winding is connected in series with voltage source $U_{bat}$.

In addition, the device for ignition of an internal combustion engine in FIG. 1*a* has a microcomputer 25 which is part of a central control unit containing a memory unit, an arithmetic unit and a time counting unit. Microcomputer 25 is connected via signal line 30 to the controllable input of controllable switch 5 of each peripheral unit 2. Digital control signals by which the respective peripheral unit triggers ignition are sent over the signal line to the peripheral units. In addition, microcomputer 25 is connected to ignition output stage 3 of peripheral unit 2 via a diagnostic line 35. Digital diagnostic signals are sent from the peripheral units to the central control unit over the diagnostic line. The time counting unit of microcomputer 25 may also be contained in a time processing unit (TPU) which operates separately from the microcomputer and has an additional arithmetic unit. The time processing unit is also part of the cental control unit. In this case, the diagnostic line(s) 35 is (are) connected to the time processing unit, in which case the time processing unit is in turn connected to the microcomputer over (a) data line(s). The time processing unit is in turn connected to the signal line(s).

Figure 1B:
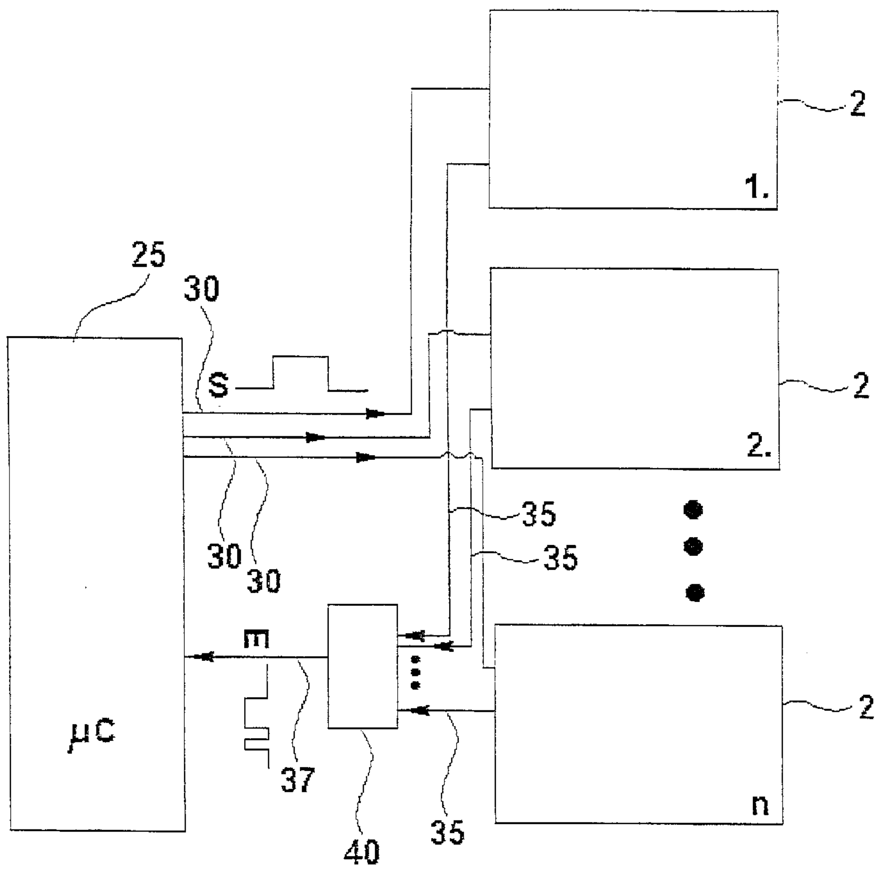

In another example embodiment, illustrated in FIG. 1*b*, a peripheral unit 2 is allocated to each cylinder. In FIG. 2*b* peripheral units 2 are illustrated for the 1st cylinder, the 2nd cylinder and the nth cylinder. This is indicated by the designations (1., 2., n) in the rectangles representing respective peripheral unit 2. Each peripheral unit 2 is connected to microcomputer 5 via a signal line 30, signal line 30 within each peripheral unit 2 leading to controllable switch 5, as illustrated in FIG. 1*a*. Each peripheral unit is also connected to a diagnostic line 35, and in this example embodiment a certain fixed number of diagnostic lines are connected to a logic operations block 40. Either all diagnostic lines of the peripheral units of all cylinders are connected to a single logic operations block, or a certain fixed number of diagnostic lines are connected to a logic operations block. In this case several such logic operations blocks are present. The logic operations block(s) may be separate modules, or they may be integrated into microcomputer 25, the time processing unit, or one or more ignition output stages 3.

Figure 1C:
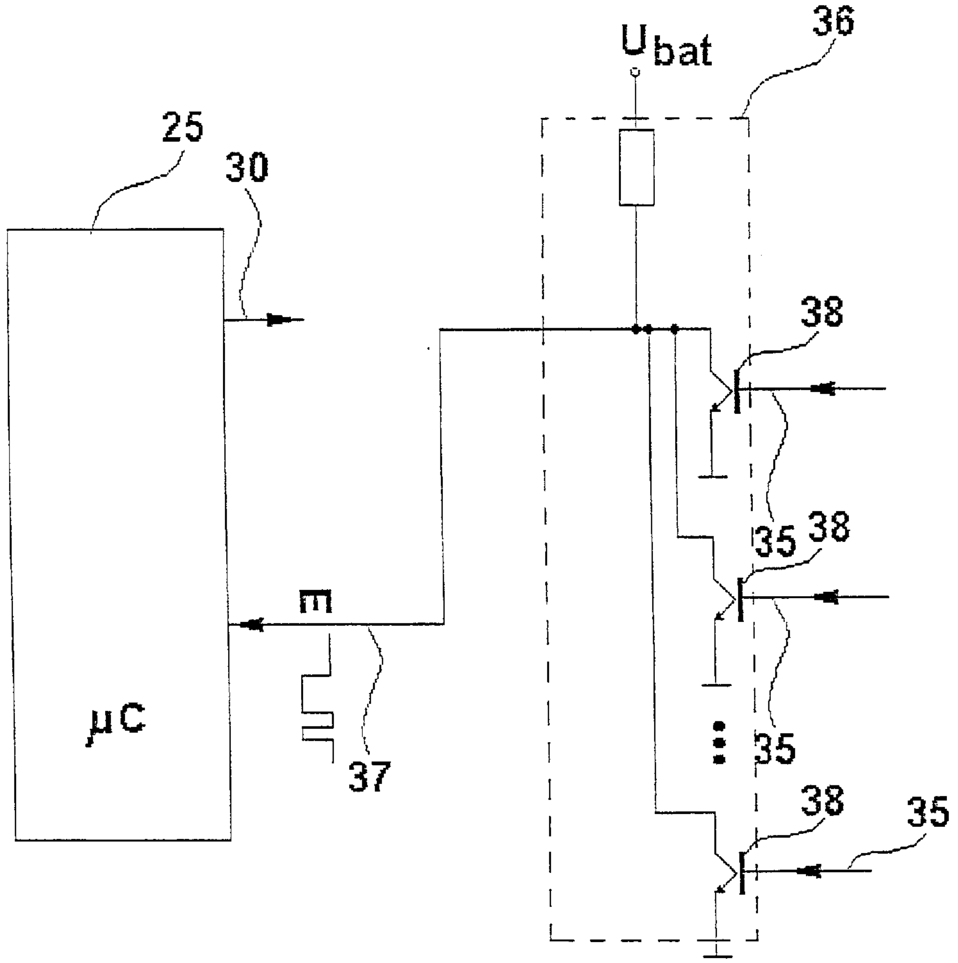

FIG. 1*c* illustrates another example embodiment in which the signals of ignition output stages 3 of the various cylinders may be linked via diagnostic lines 35 via open-collector circuits 36. The signals of several diagnostic lines 35 may thus be linked to the signal of a diagnostic bus line 37, and either the signals of all diagnostic lines or groups of e.g., two, three or four diagnostic lines 35 may be combined into one diagnostic bus line 37. Each diagnostic line 35 of a 1st cylinder, a 2nd cylinder and an nth cylinder (counting from top to bottom in FIG. 1*c*) is connected to the base of a controllable switching element 38 of open-collector circuit 36, the controllable switching element, e.g., configured as a transistor. The emitter of each controllable switching element 38 is connected to reference potential. The collectors of controllable switching elements 38 of each group are connected to one another in parallel and are connected in series to a pull-up resistor at the battery voltage. The collectors of the controllable switching elements are also connected to microcomputer 25 or the time processing unit via diagnostic bus line 37.

Figure 1D:
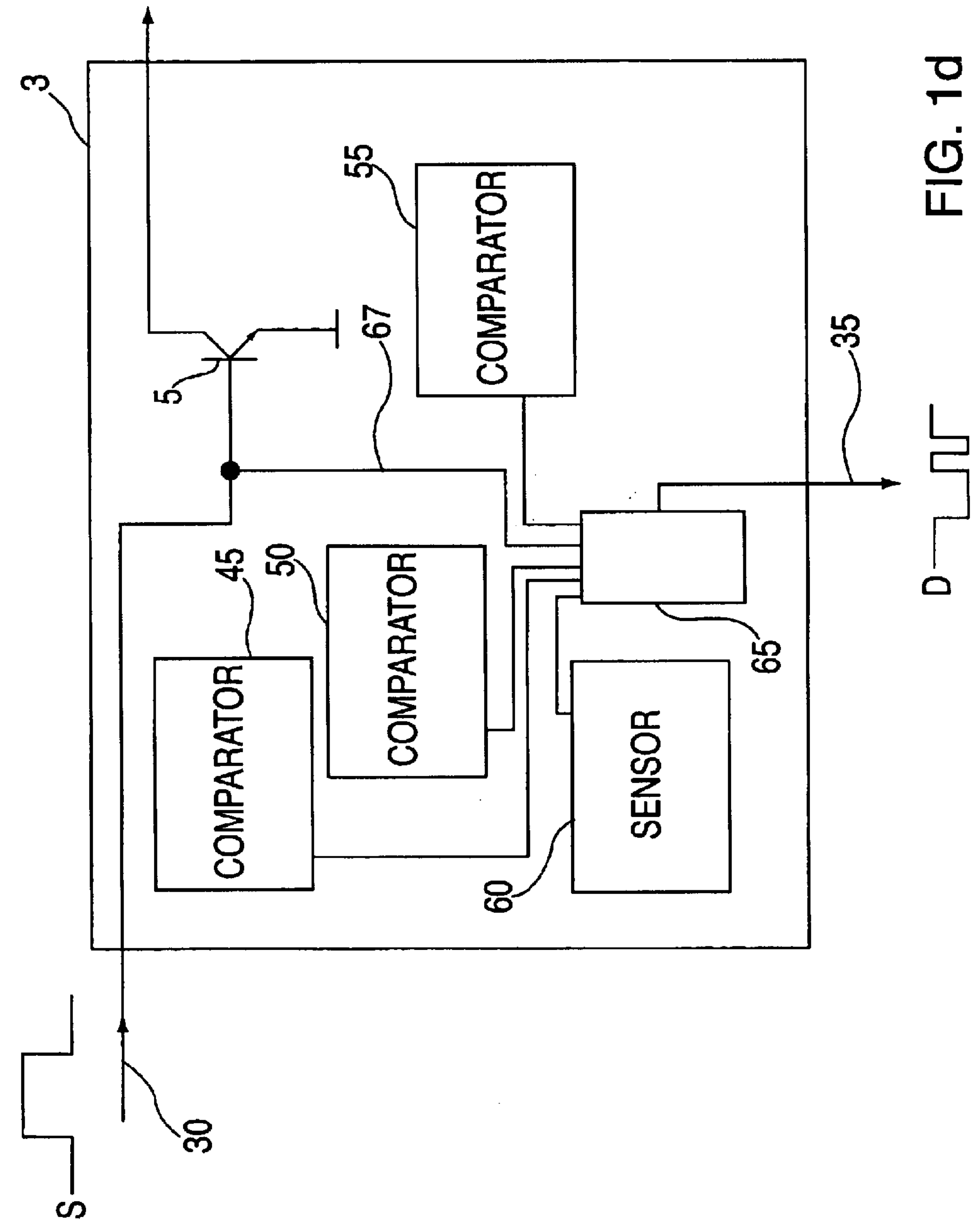

FIG. 1*d* illustrates ignition output stage 3 of a cylinder again in greater detail. In addition to controllable switch 5, described above, which is connected to signal line 30 and primary winding 10 as well as internal combustion engine reference potential, at least one comparator, e.g., a first comparator 45, a second comparator 50 and a third comparator 55, at least one sensor, e.g., a first sensor 60, and a signal edge-forming element 65 are parts of ignition output stage 3. The output of the signal edge-forming element 65 is connected to diagnostic line 35, while the outputs of comparators 45, 50, and 55 and a connecting line 67 to signal line 30 are connected to the inputs of the signal edge-forming element. Within the signal edge-forming element 65, the lines originating from the first 45, second 50, and third 55 comparators and the sensor 60, as well as the signal line, 30 these lines all receiving signal edges, are also linked to diagnostic line 35 via a logic operations block or an open-collector circuit.

Figure 2:
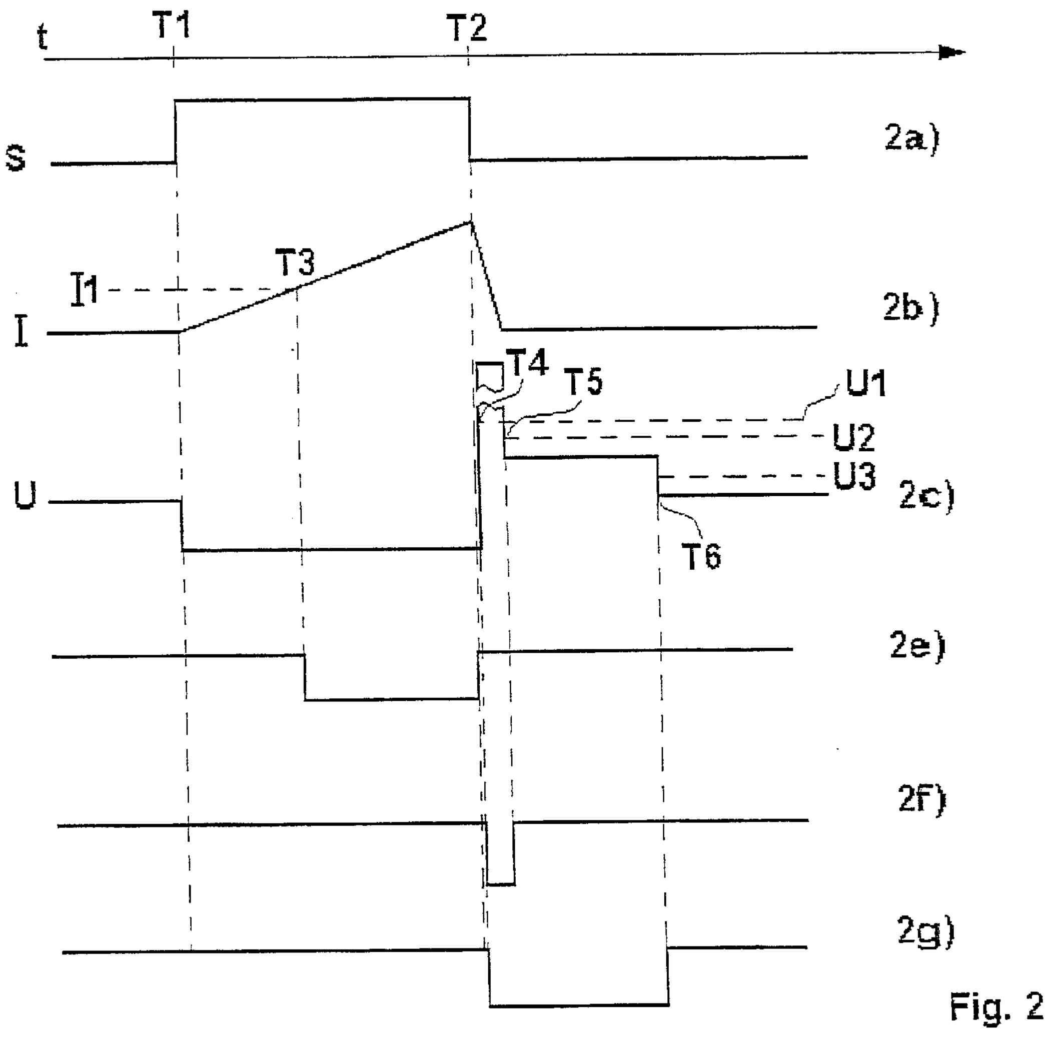
FIGS. 2*a*, 2*b*, 2*c*, 2*e*, 2*f*, and 2*g* illustrate an example time characteristic of an activation signal, a primary current, a primary voltage, a current diagnostic signal, and two examples of a voltage diagnostic signal according to the present invention.

The functioning of the components of the device according to the present invention for ignition of an internal combustion engine as described with reference to FIGS. 1*a* to 1*d* will now be explained further with reference to FIGS. 2 to 5. In FIGS. 2 through 5, time is plotted on the abscissa. This is indicated on the basis of the time line at the top of the Figures. The signal transmitted over signal line 30 from the microcomputer to controllable switch 5 of ignition output stage 3 of a cylinder is plotted in FIG. 2*a*. At a first point in time T1, controllable switch 5 is switched on by the signal of signal line 30, a turn-on edge, and a primary current flows from voltage source $U_{bat}$ to the internal combustion engine block over primary winding 10 and controllable switch 5. FIG. 2*b* illustrates the characteristic of primary current I. FIG. 2*b* illustrates that primary current I rises continuously with time. At a third point in time T3, a certain selected first threshold value I1 is exceeded. At a second point in time T2, controllable switch 5 is blocked by an edge in the signal of signal line 30, the shutoff signal edge, and thus a high voltage is generated in secondary winding 15 of ignition coil 8, which then produces an ignition spark on spark plug 20. The procedure between first point in time T1 and second point in time T2 during which the controllable switch is switched through is referred to as the charging operation. Primary current I drops rapidly to zero after second point in time T2. Primary voltage U applied on the primary side is plotted as a function of time in FIG. 2*c*. Primary voltage U is measured from a point between controllable switch 5 and primary winding 10 against reference potential in the device according to the present invention for ignition of an internal combustion engine. Before first point in time T1, the primary voltage is at battery voltage $U_{bat}$ which is determined by the voltage source. After first point in time T1 at which controllable switch 5 is opened, the primary voltage drops to the saturation voltage. After second point in time T2, after a high voltage has been induced in secondary winding 15, the operating voltage, i.e., the voltage at which the spark burns on the spark plug, is transformed back to the primary side. The primary voltage here has the characteristic illustrated in FIG. 2*c*. In a short period of time after second point in time T2, the primary voltage rises again very sharply and then drops again very sharply but remains at a high level while the ignition spark is burning. During the sharp increase in the primary voltage, the primary voltage exceeds a certain fixed selected second threshold value of primary voltage U1 at a fourth point in time. After the ignition spark is extinguished, the primary-voltage drops again until reaching the battery voltage. During the decline in the primary voltage, the primary voltage passes through a certain fixed selected third threshold value. This may be a voltage value U2 or a voltage value U3 (see FIG. 2*c*), for example. If voltage value U2 is selected as the third threshold value, then at a fifth point in time T5, the primary voltage drops to voltage levels below this third threshold value U2. However, if lower voltage U3 is preselected as the third threshold value, then at a sixth point in time T6, the primary voltage drops to voltage levels below this third threshold value U3.

The generation of the diagnostic signal which goes via diagnostic line 35 or diagnostic bus line 37 to microcomputer 25 or to the time processing unit will now be explained. As illustrated in FIG. 1*d* and explained above, ignition output stage 3 has at least one comparator 45, 50, 55 and/or sensor 60 and a signal-forming element, e.g., a signal edge-forming element 65. Variables of the ignition circuits, e.g., the primary current and primary voltage, may be compared using the comparator. If one variable of the ignition circuit changes so that it exceeds or drops below a certain fixed selected threshold value, then the signal-forming element connected to the comparator forms a diagnostic signal. The signal edge-forming element may generate a first or second signal edge which is then output over diagnostic line 35. The allocation of which of the two signal edges is generated and at which event (exceeding or dropping below the threshold value) is performed within the signal edge-forming element. However, it may also be handled within the application. The signal edge-forming element may also have a connection 67 to signal line 30. Thus, first or second signal edges may also be formed when the turn-on edge or the shutoff signal edge reaches the controllable switch. Likewise, a certain fixed selected state of the ignition output stage may also be detected by one or more sensors 60. It is also possible to determine whether the temperature of the components of the ignition output stage is so high that they may be shut down, i.e., whether an excess temperature shutdown may be performed. If a certain state is detected, the signal edge-forming element may also generate a first or second signal edge and output it to the diagnostic line. A first signal edge means a jump in level from 0 to 1 (positive signal edge) or from 1 to 0 (negative signal edge), and a second signal edge means an opposite jump in level, i.e., from 1 to 0 (negative signal edge) or from 0 to 1 (positive signal edge). The diagnostic signals formed by signal-forming element 65 may also include other digital signals in addition to signal edges, but they may also be relayed and analyzed like signal edges, taking into account their shape. Therefore, the following discussion may be based only on signal edges as an example embodiment of the diagnostic signals.

In an example embodiment of the present invention, comparator 45 compares whether the primary current exceeds a certain fixed selected first threshold I1. Signal edge-forming element 65 then forms a first signal edge, the charging signal edge, when the primary current exceeds first threshold value Ii, i.e., at a third point in time T3 (see FIG. 2*b*). The signal, which in this case is applied to the diagnostic line, is illustrated in FIG. 2*e*. At third point in time T3, the level changes from 1 to 0. In the example embodiment, a second signal edge, the second charging signal edge, is generated by the signal edge-forming element when, after the beginning of the charging operation, the shutoff signal edge is applied in signal line 30. This signal edge is applied at second point in time T2 and causes controllable switch 5 to be blocked. The second charging signal edge at second point in time T2, which in this example embodiment means a change in level from 0 to 1, is also illustrated in FIG. 2*e*.

In another example embodiment, comparator 50 compares whether the primary voltage exceeds a second threshold value U1. If the second threshold value is exceeded at a fourth point in time T4, signal edge-forming element 65 generates a first signal edge, the first voltage signal edge, and relays it to diagnostic line 45. The first voltage signal edge is illustrated in FIGS. 2*f* and 2*g*. In the example embodiment, it is a negative signal edge. A second signal edge, the second voltage signal edge, is generated as a positive signal edge in the example embodiment when comparator 55 determines that the primary voltage is below a third threshold value. Such a threshold value may be a second voltage value U2 or a third voltage value U3. FIG. 2*f* illustrates the case where the second voltage signal edge is generated when the value drops below a second voltage value U2 (at a fifth point in time T5), and FIG. 2*g* illustrates the case where the second voltage signal edge is formed when the value drops below a third voltage level U3. Through the choice of threshold values, as illustrated by the comparison of FIG. 2*f* with FIG. 2*e*, differences in the duration of level 0 are achieved. Voltage values U1, U2 and U3 may be configured to be applicable in an example embodiment.

Figure 3:
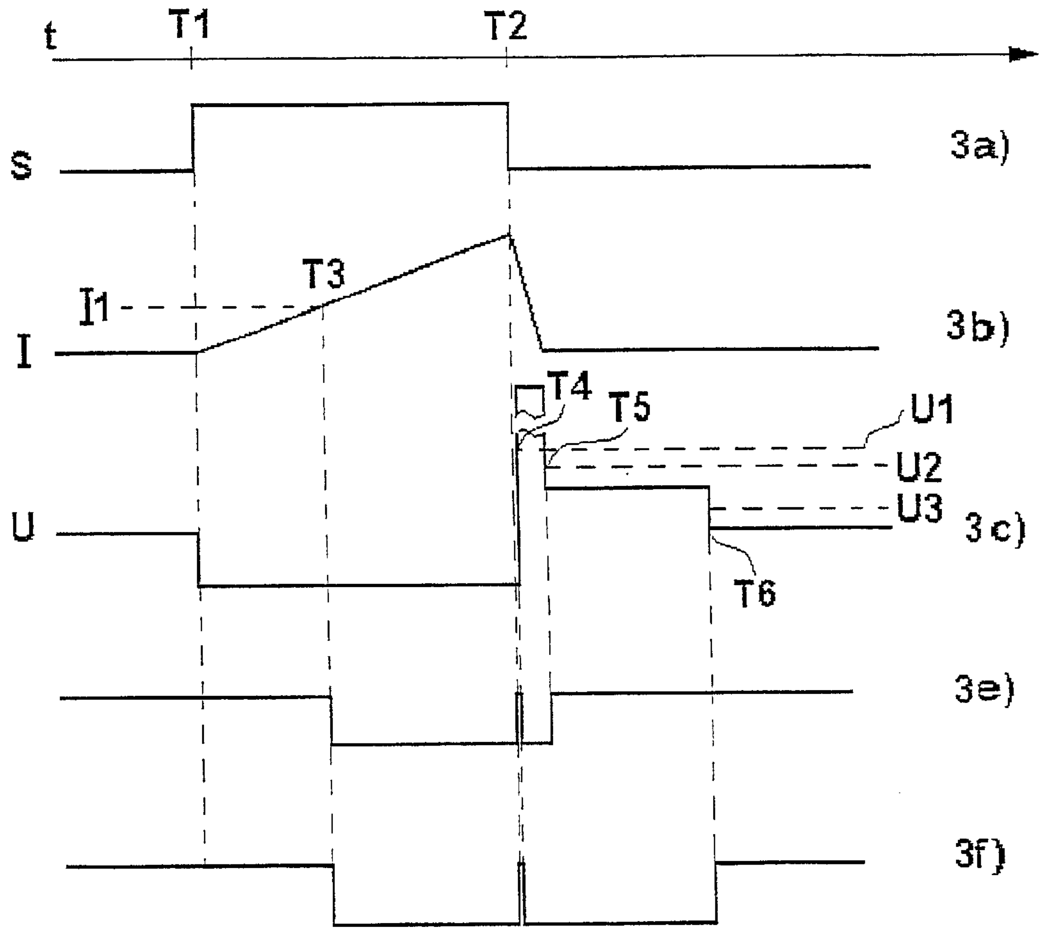
FIGS. 3*a*, 3*b*, 3*c*, 3*e* and 3*f* illustrate an example time characteristic of an activation signal, a primary current, a primary voltage, and two example embodiments of a current/voltage diagnostic signal according to the present invention.

FIG. 3 illustrates another example embodiment for generating the signal edges, where charging signal edges and voltage signal edges are generated in succession and are output to the same diagnostic line 35. FIGS. 3*a* to 3*c* correspond to FIGS. 2*a* to 2*c*. The signal of diagnostic line 35 is plotted over time in FIG. 3*e*. By analogy with FIG. 2*e*, a first charging signal edge is generated at a third point in time T3 and a second charging signal edge at a second point in time T2. Then by analogy with FIG. 2*f*, a first voltage signal edge is formed at a fourth point in time and a second voltage signal edge is formed at a fifth point in time. A successive combination of signals is possible when the pairs of signal edges for different events occur in succession in chronological sequence, a pair of signal edges being the first and second signal edges that belong together. FIG. 3*f* illustrates a signal similar to that illustrated in FIG. 3*e* for the diagnostic line, differing from the signal illustrated in FIG. 3*e* only in that the third threshold value is at a different voltage level.

Figure 4:
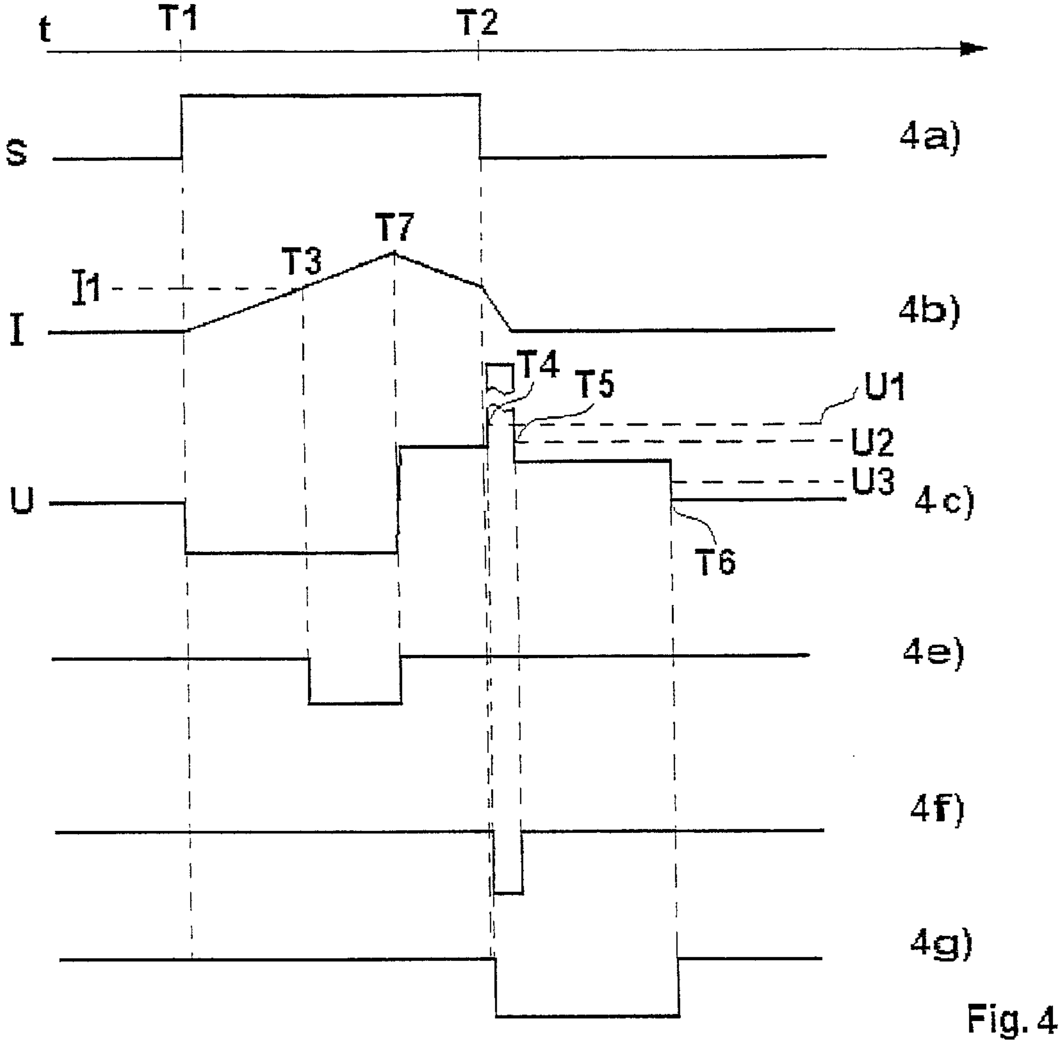
FIGS. 4*a*, 4*b*, 4*c*, 4*e*, 4*f* and 4*g* illustrate an example time characteristic of an activation signal, a primary current, a primary voltage, a current diagnostic signal, and two example embodiments of a voltage diagnostic signal in the case of an excess temperature shutdown.

FIG. 4 illustrates the time characteristics of the signals for another example embodiment for generating signal edges. FIG. 4*a* is analogous to FIG. 2*a*. In FIG. 4*b*, the primary current is plotted as a function of time. As in FIG. 2*b*, the primary current rises continuously after a first point in time T1, exceeding a first threshold I1 at a third point in time. At a seventh point in time T7, an excess temperature shutdown of modules of the ignition output stage is implemented, when the temperature of certain modules is too high. The primary current drops slowly after seventh point in time T7, continuing to drop after reaching second point in time T2 until reaching a primary current of zero. FIG. 4*c* illustrates the respective characteristic of the primary voltage over time. This characteristic is similar to the characteristic illustrated in FIG. 2*c* up to seventh point in time T7. Because of the excess temperature shutdown, the primary voltage then increases and it increases another time after second point in time T2. The following characteristic is similar to that illustrated in FIG. 2*c*. FIG. 4*e* illustrates the signal characteristic of the diagnostic line when one signal edge is generated on the basis of the excess temperature shutdown. As in FIG. 2*e*, a first charging signal edge is first generated at a third point in time T3. At a seventh point in time T7, the excess temperature shutdown then occurs and is detected by sensor 60. Signal edge-forming element 65 then generates a second signal edge, called the excess temperature shutoff signal edge, as indicated in FIG. 4*e*. Since the level of the diagnostic line is already at 1, another second signal edge, specifically a second charging signal edge which is generated at second point in time T2 without an excess temperature shutdown, has no effect on the level on diagnostic line 35. The diagnostic signals generated in FIGS. 4*f* and 4*g* correspond to the diagnostic signals from the primary voltage characteristic, as discussed above with reference to FIGS. 2*f* and 2*g*.

Figure 5:
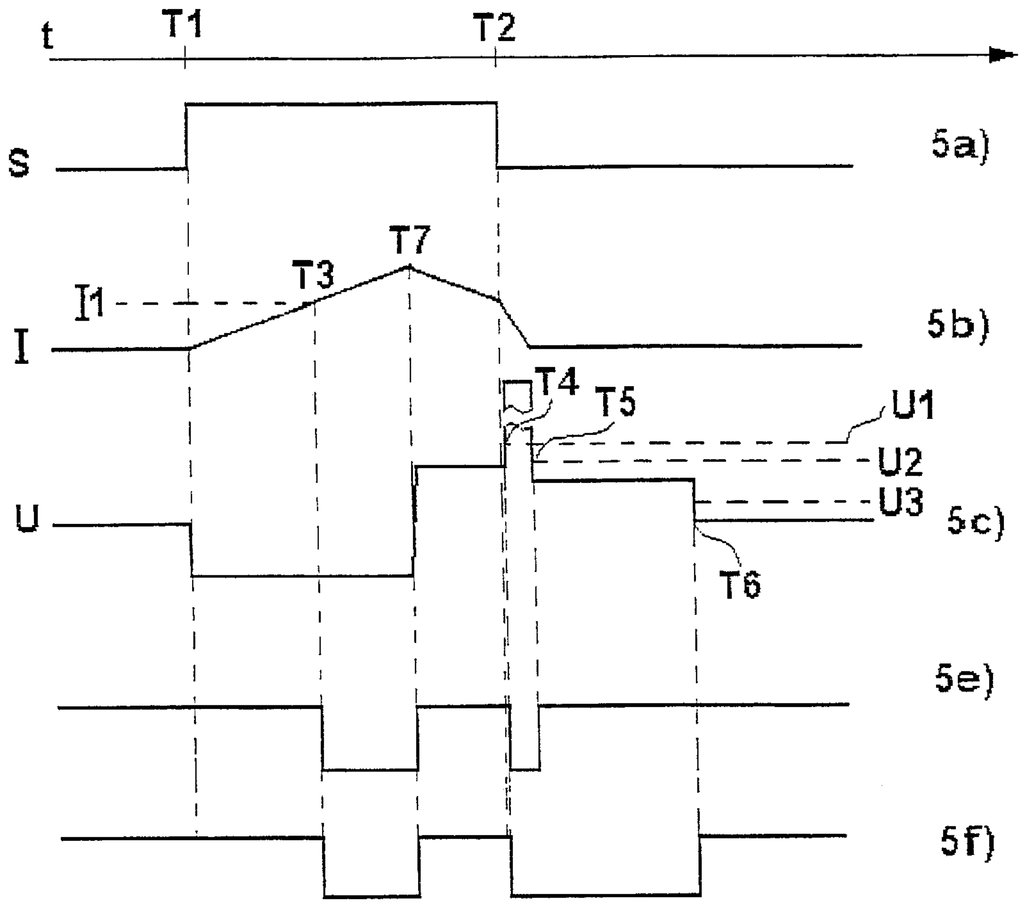
FIG. 5 illustrates an example time characteristic of an activation signal, a primary current, a primary voltage and two example embodiments of a current/voltage diagnostic signal in the case of an excess current shutdown.

The characteristics of signals of another example embodiment are plotted in FIG. 5. The characteristic of the activation signal illustrated in FIG. 5*a*, the characteristic of the primarily current illustrated in FIG. 5*b* and that of the primary voltage illustrated in FIG. 5*c* correspond to the characteristics plotted in FIGS. 4*a* through 4*c*. FIG. 5*e* illustrates the diagnostic signal plotted as a function of time. A first charging signal edge is first generated at third point in time T3, and a second excess temperature shutoff signal edge is generated at seventh point in time when an excess temperature shutdown occurs. Then as illustrated in FIG. 3*e*, first and a second voltage signal edges are formed. The characteristic of the diagnostic signal illustrated in FIG. 5*f* differs from the characteristic of the diagnostic signal illustrated in FIG. 5*e* only in that the third threshold value for the second voltage signal edge is at a lower voltage level.

Each of the diagnostic signals described above may be generated for the peripheral unit of each cylinder. The digital diagnostic signals go over diagnostic line 35 to microcomputer 25 or to the time processing unit. As illustrated in FIG. 1*b*, a diagnostic line 35 goes from peripheral unit 2 of each cylinder. In the case of multiple cylinders, multiple diagnostic lines 35 may be connected to logic operations block 40, their ignition cycles being far enough apart that it is possible to separate the diagnostic signals of the cylinders. In an example embodiment, up to four diagnostic lines 35 from four cylinders may be combined using one logic operations block 40. As already described, the output of logic operations block 40 forms a diagnostic bus line 37 which relays the linked diagnostic signal to the microcomputer or the time processing unit. Logic operations block 40 performs a logic-operation on the incoming-diagnostic signals in the correct chronological order. This means that a level 0 is generated at the output when at least one of the incoming diagnostic signals has a level of 0. Only when the levels of all incoming diagnostic lines have a 1 is the level at the output of logic operations block 40 set at 1. The logic contained in logic operations block 40 depends on whether a first signal edge means a change in level from 0 to 1 or from 1 to 0. The variant presented includes a level change in the first signal edge from 1 to 0 (negative signal edge). In the other case, when the first signal edge denotes a positive signal edge, the linkage is via logic operations block 40 so that a 1 is then generated at the output when at least one of the levels of the incoming diagnostic signals has a 1, and a 0 is generated at the output when the levels of all the incoming diagnostic signals have a 1.

A similar logic operation on the signals of the diagnostic lines of individual cylinders is also implemented via the open-collector logic circuit as illustrated in the example embodiment illustrated in FIG. 1*c*. In this case, a level 0 is generated in diagnostic bus line 37 exactly when a level 1 is applied to at least one diagnostic line 35. Then a controllable switching element is switched through and a current flows from $U_{bat}$ to the internal combustion engine block. Thus, the voltage at the collector becomes zero. If all the levels of diagnostic lines 37 are at 0, then all controllable switching elements 38 are in the blocking state and the level of the diagnostic bus line is at 1. With this example embodiment for a device according to the present invention for ignition, the signal edges of the diagnostic bus line will thus be opposite the signal edges of the diagnostic lines but will have the correct chronological order, i.e., a positive signal edge becomes a negative signal edge and a negative signal edge becomes a positive signal edge. Taking into account this property, a distinction may still be made between first and second signal edges.

The signals of diagnostic line(s) 35 or diagnostic bus line(s) 37 then go either to the microcomputer or to the time processing unit (TPU), if such is provided. As explained above, both units include a time counting unit. By comparing the signals from diagnostic lines 35 or diagnostic bus lines 37 and signal lines 30 with the time which continues to be incremented in the time counting unit, it is possible to determine periods of time between individual events which are associated with signals on the lines. In this manner, any desired periods of time between signal edges on the signal line and the diagnostic line may be used, even in combinations of signal edges of different lines.

In one example embodiment, the time difference between the turn-on edge and the first charging signal edge, i.e., between first point in time T1 and third point in time T3, is determined, and this time is referred to as the starting time. In another example embodiment, the time difference between the first and second charging signal edges (i.e., between T3 and T2) is determined. This time difference is called the charging time. If an excess temperature shutdown occurs, the second signal edge, which determines the end of the charging time, may also be the excess temperature shutoff signal edge. In another example embodiment, the time differences are determined between the shutoff signal edge and the first voltage signal edge (i.e., between T2 and T4), which is also called the rise time, and/or the time difference between the first and second voltage signal edge (i.e., between T4 and T5 or T6), which is also called the ignition time. These periods of time may be allocated to the respective cylinder on the basis of the respective activation signal, and it is also possible to differentiate whether the time difference between two signal edges of one signal edge pair belongs to the charging time or to the ignition time. In the case of a time difference corresponding to the charging time, the charging operation is not yet concluded at the time of occurrence of the first signal edge, i.e., second point in time T2 at which controllable switch 5 is blocked by the shutoff signal edge has not yet been exceeded, whereas at the beginning of the ignition time, second point in time T2 of the respective ignition operation of the respective cylinder has already been exceeded. The periods of time thus determined are then relayed to the arithmetic and storage unit of microcomputer 25.

Figure 6:
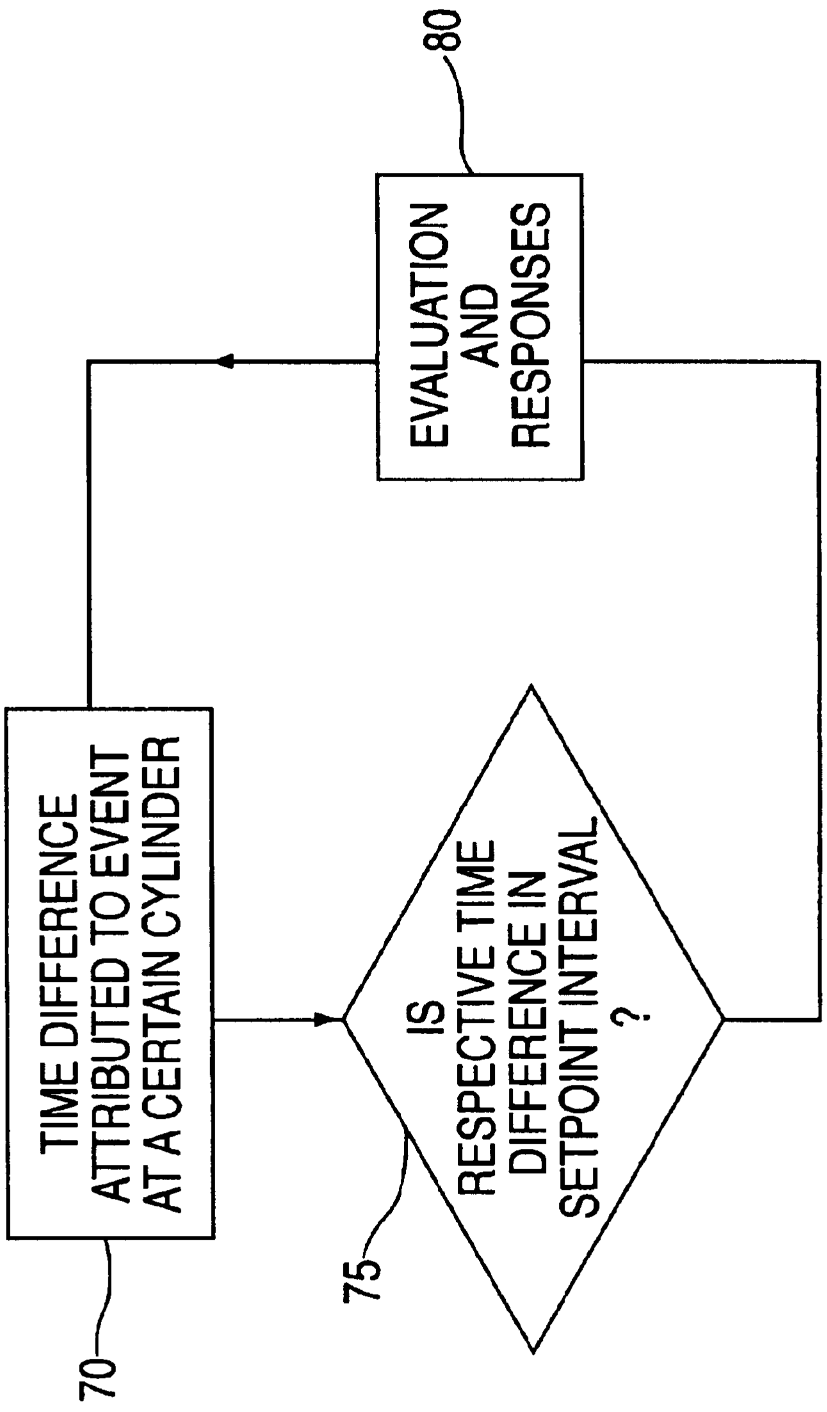
FIG. 6 illustrates a flow chart of the method for ignition of an internal combustion engine according to an example embodiment the present invention.

The periods of time thus determined are then evaluated for whether the ignition process is occurring properly. Through a suitable choice of the threshold values, e.g., the first, second and third threshold values, conclusions regarding the type of fault that has occurred in the ignition circuit may be drawn from the length of the periods of time determined, e.g., from the length of the turn-on time. The types of faults may then be stored in a cylinder-specific file in a memory and/or displayed on the instruments of the internal combustion engine, or emergency programs may be initiated. Such a method according to the present invention is illustrated schematically in FIG. 6. At step 70, a time difference that has been determined is allocated to a certain event of a certain cylinder of the internal combustion engine. In a subsequent step 75, a check is performed to determine whether the respective time difference is within a certain setpoint interval or whether it is greater than the maximum or less than the minimum of the setpoint interval or whether the respective time difference could be determined at all. Then in step 80 an evaluation and possible responses to the evaluation are implemented. If the respective time difference is within the certain setpoint interval, then the ignition process is interpreted as being correct. If the respective time difference is not within the setpoint interval determined, then it is possible to conclude that certain errors have occurred, depending on whether the time difference is greater than or less than the setpoint interval or whether it is possible to determine the time difference at all. These faults may then be stored in the memory of the microcomputer or output as a warning on the display elements. Fault-specific emergency measures may also be initiated. These measures may be taken in conjunction with other functions of the internal combustion engine. In addition, it is possible to use additional parameters of the internal combustion engine for fault analysis to obtain more accurate and more reliable information regarding the faults occurring in the ignition circuit. Thereafter, the method is continued with another subsequent time difference. The setpoint intervals may be determined on the basis of model calculations as a function of internal combustion engine parameters, relative to the battery voltage, for example, and stored in the memory unit of the microcomputer, where they are selected for the respective evaluation to be performed as a function of the internal combustion engine parameters. Storing the setpoint intervals in the memory unit may also be performed in the application. In another example embodiment, it is possible to determine setpoint intervals during the running time of the internal combustion engine from the instantaneous measured values and to determine by using statistical methods which measured values belong to the respective setpoint interval. It is also possible to compare the measured time difference with a setpoint and to determine whether the measured value is greater than or less than the setpoint value. In an example embodiment, the ratio of the measured time difference to the measured time difference of the preceding combustion cycle in the same cylinder may be formed. This ratio may be within a certain, fixedly selected range around 1. Changes attributed to a change in battery voltage or temperature in the short periods of time between two ignition processes of the same cylinder may be negligible.

Figure 7:
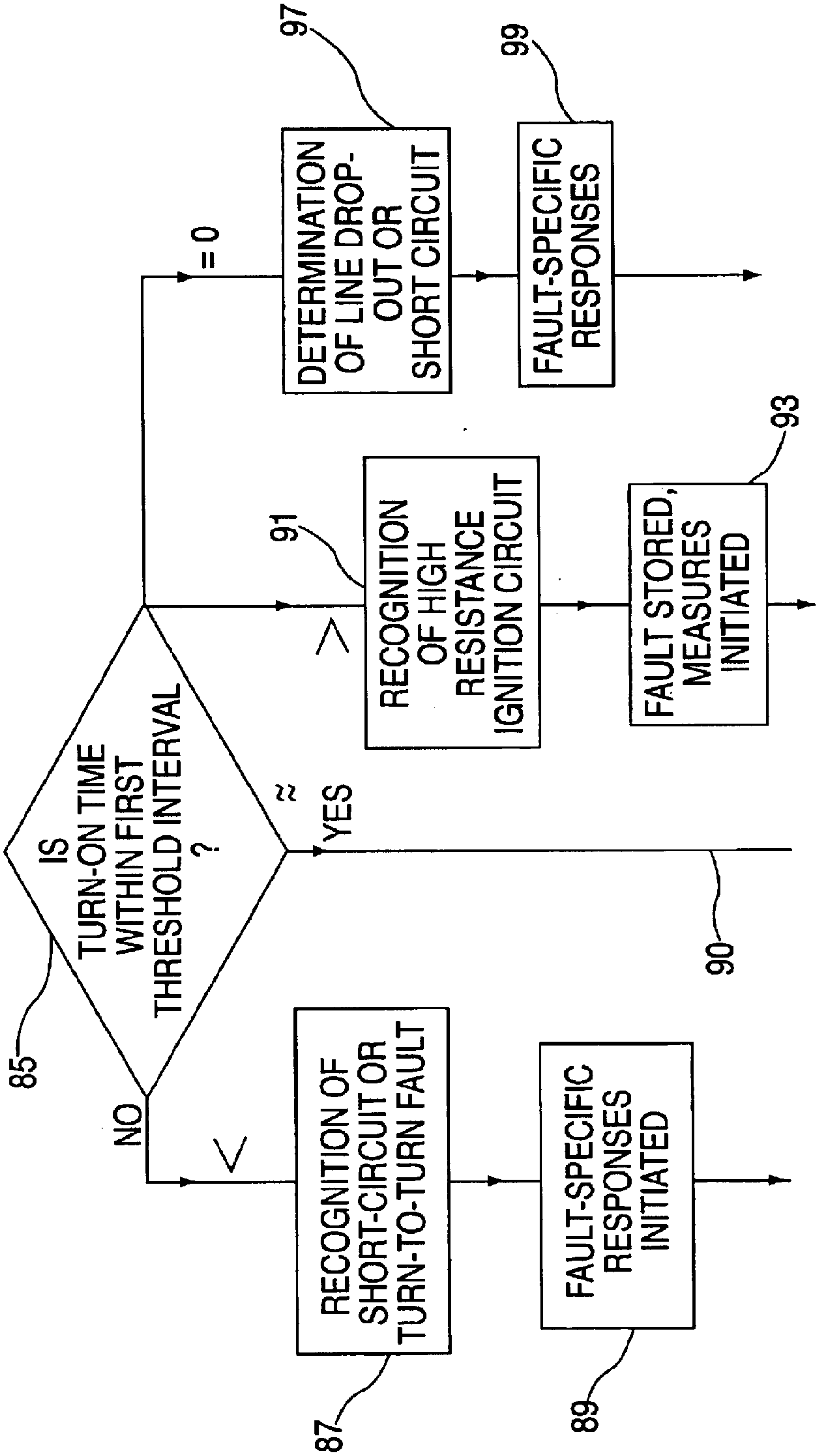
FIG. 7 illustrates a flow chart for the method for processing the turn-on time according to an example embodiment of the present invention.

An example embodiment which is illustrated in FIG. 7 illustrates the analysis of the turn-on time. Step 85 compares whether the turn-on time is within a certain first threshold interval. If that is the case, then the method is continued on path 90 with the time difference determined subsequently, without intervention into the peripheral unit. If the turn-on time is greater than the maximum of the first setpoint interval, the method goes to step 91. Step 91 recognizes that it is a high-resistance ignition circuit. In following step 93, the resulting emergency measures are initiated, the fault is stored for the corresponding cylinder in the memory of microcomputer 25 and/or warnings are displayed on the display elements of the internal combustion engine. If the turn-on time is less than the minimum of the first setpoint interval, then step 87 recognizes that there is a short circuit to the battery voltage or a turn-to-turn fault in the ignition circuit. In step 89, as in step 93, fault-specific responses to the given fault are initiated.

Emergency measures, which may be taken in the event of such a fault and prevent excessive power loss in the device for ignition from destroying the components, may include shortening the charging operation by microcomputer 25, immediate shutdown of ignition coil 8, reducing the internal combustion engine speed, limiting the filling of the respective combustion chamber of the internal combustion engine, or ignition at a firing angle which is at the earliest possible angle with respect to the top dead center. Likewise, in example embodiments of the internal combustion engines, the following emergency measures may be taken. In a direct-injection gasoline internal combustion engine, it is possible to switch from stratified charge operation to homogeneous operation, or in the case of an internal combustion engine having a turbocharger, the charging pressure may be reduced.

If no turn-on time at all has been measured, the method goes to step 97, where it is determined that there has been a line drop-out or a short circuit to reference potential. In step 99, responses to the respective faults similar to those in step 93 are taken.

Figure 8:
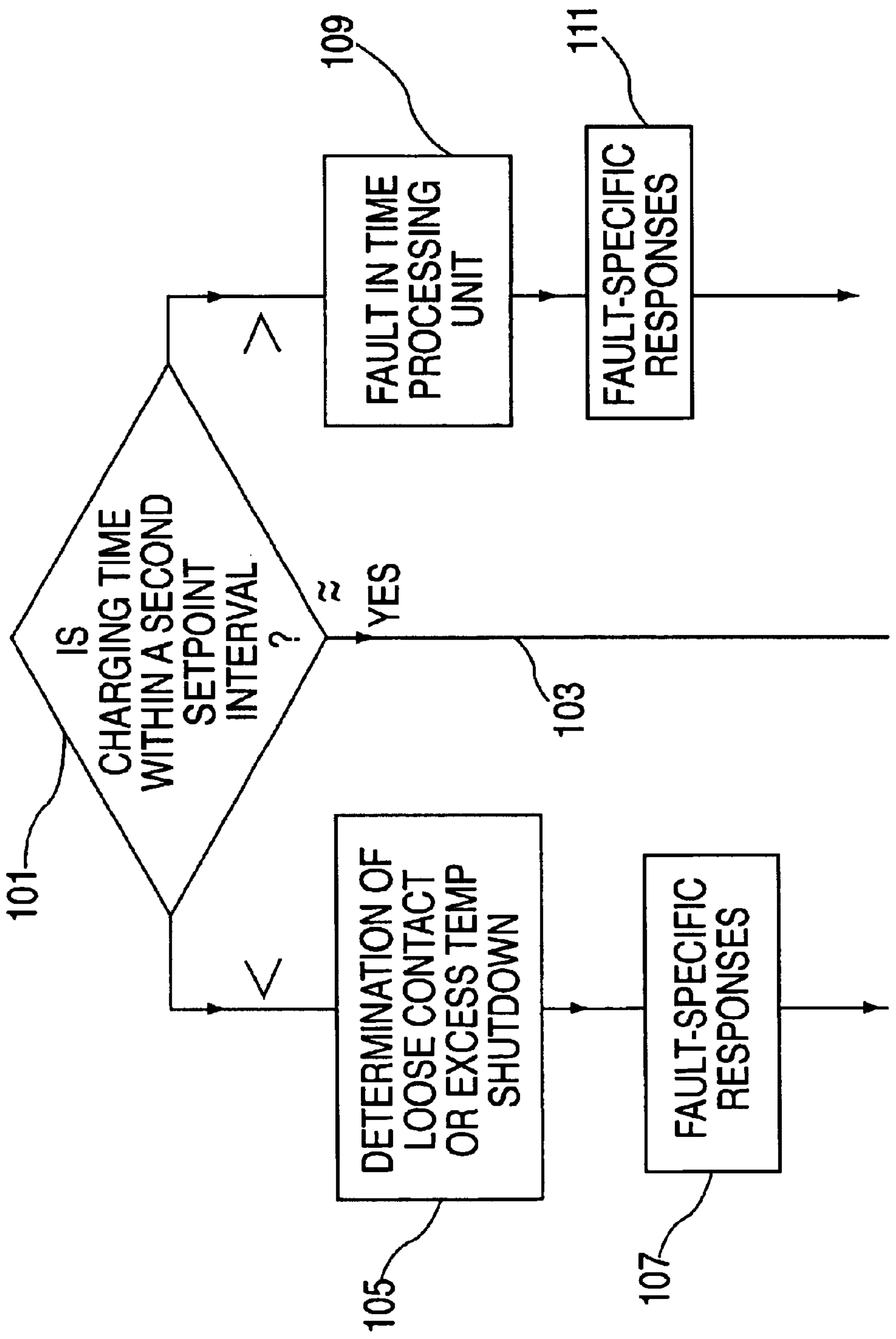
FIG. 8 illustrates a flow chart of the method for processing a charging time according to an example embodiment of the present invention.

Another example embodiment for a method of analyzing the charging time according to the present invention is illustrated in FIG. 8. A check is performed in step 101 to determine whether the charging time is within a second setpoint interval. As in FIG. 7, path 90, the method is then continued with the next time difference. If this is the case, then the method goes to path 103 and the ignition is evaluated as being correct. In the case of a charging time which is less than a minimum second setpoint interval, the method goes to step 105, where it is determined that there is a loose contact or there has been an excess temperature shutdown. An excess temperature shutdown is more likely if no second charging time is measured within the time difference of the respective charging operation. In subsequent step 107, responses to the respective faults are initiated as in step 93. If the measured charging time is greater than the maximum second setpoint interval, then the method goes to step 109, which ascertains that there has been a fault in the time processing unit. In step 111, the next step to be implemented, response measures are taken as in method step 93. In addition to the emergency measures taken in step 93, when the charging time is exceeded, ignition may also be triggered by the microcomputer, i.e., application of a high voltage and jumping a spark between the two electrodes of the spark plug, by switching controllable switch 5 through.

Figure 9:
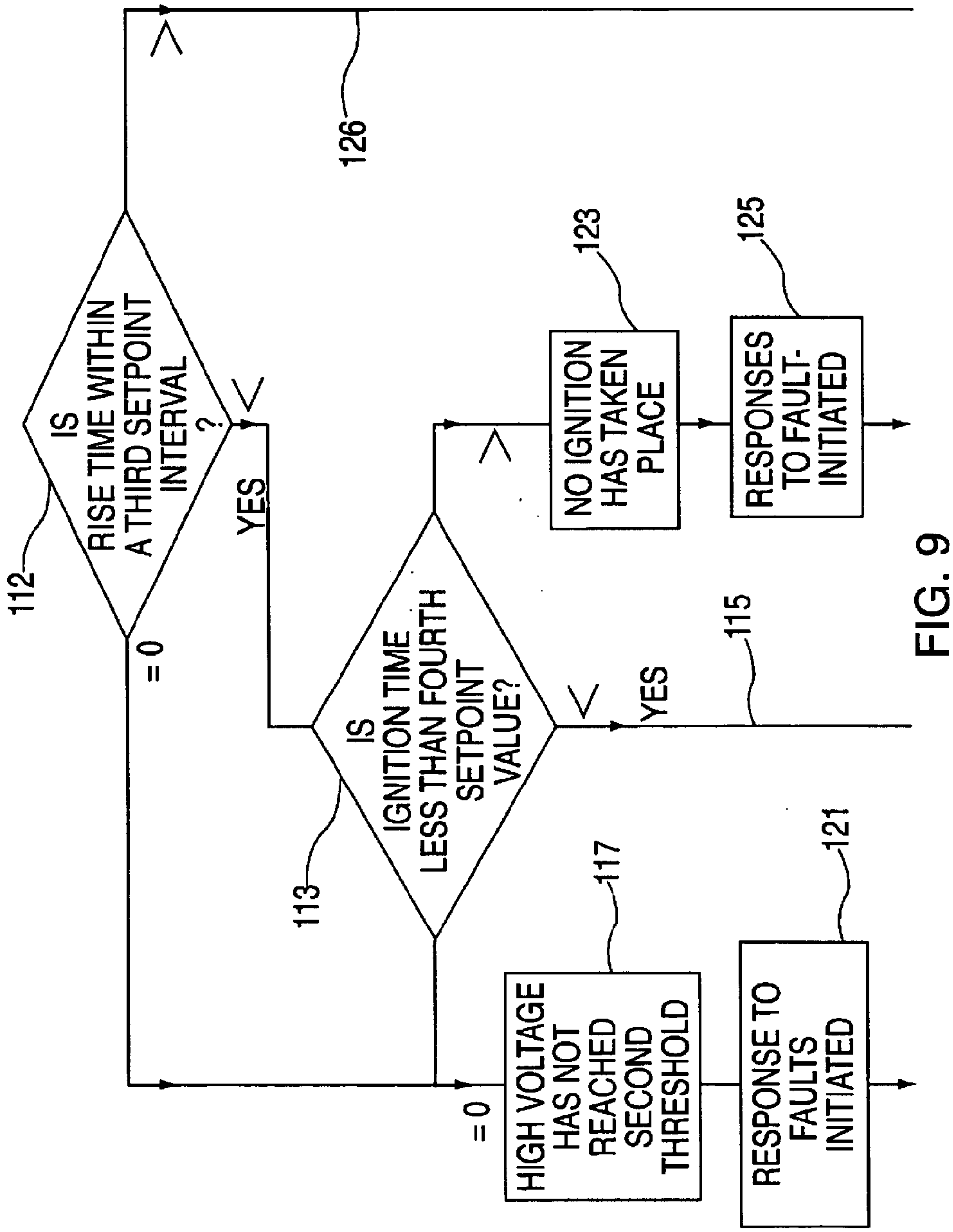
FIG. 9 illustrates a flow chart of the method for processing an ignition time according to an example embodiment of the present invention.

Another example embodiment of a method for analyzing ignition time according to the present invention is described with reference to FIG. 9. In step 112, a check is performed to determine whether the rise time is less than a third setpoint value. If this is the case, the method goes to step 113, where a check is performed to determine whether the ignition time is less than a fourth setpoint value. If this is the case, the method goes to path 115, where the method is continued with the next time difference, as in the case of path 90. Ignition is then evaluated as being correct. If no rise time and no ignition time are detected, then the method goes to step 117, which ascertains that the high voltage has not reached the second threshold and thus a certain power could not be made available for the spark plugs. In step 121 which then follows, responses to the faults are implemented as in step 93. If the measured ignition time is greater than the fourth setpoint value, then the method goes to step 123, which ascertains that the voltage has died down and thus no ignition has taken place. In step 125, which is implemented next, responses to the fault are initiated as in method step 93. If the rise time is greater than a third setpoint value, the charging time subsequently determined is not used for diagnosis of the ignition process and the method is continued on path 126 with analysis of the time difference determined next.

The example embodiments described are based on an inductive ignition system, but a similar device and a similar method may also be used with capacitive ignition systems.

Likewise, the example embodiments described may also be applied to measured quantities of the primary circuit such as the primary current and primary voltage, and a similar device and a similar method for ignition of an internal combustion engine may also be described on the basis of measured quantities of the secondary circuit.

The present invention also relates to a device and a method for ignition of an internal combustion engine, in which it is possible to diagnose the ignition process with simple arrangements in terms of the circuitry, and the diagnosis permits detailed information regarding possible sources of faults.

What is claimed is:

1. A device for ignition of an internal combustion engine comprising:

a central control unit; and at least one peripheral unit, each peripheral unit allocated to a respective cylinder of the internal combustion engine and including a first comparator, a second comparator and a third comparator, each comparator configured to generate diagnostic signals, the first comparator configured to determine whether a primary current has exceeded a preselectable first threshold, the second comparator configured to determine whether a primary voltage has exceeded a preselectable second threshold, the third comparator configured to determine whether the primary voltage has dropped below a preselectable third threshold;

wherein the central control unit is configured to transmit digital activation signals to the peripheral units to trigger the peripheral units to cause ignition of the respective cylinder; and wherein the peripheral units are configured to determine measured values representing states in the peripheral units and to transmit digital diagnostic signals to the central control unit as a function of the measured values; and wherein the central control unit is configured to determine at least one first time difference between the activation signals and the diagnostic signals for analysis of the diagnostic signals and to determine at least one second time difference between the diagnostic signals for analysis of the diagnostic signals.

2. The device according to claim 1, wherein the central control unit is configured to compare the at least one of the first time difference and the second time difference with one of setpoint values and setpoint intervals.

3. The device according to claim 2, wherein the central control unit is configured to determine a fault in the ignition device.

4. The device according to claim 3, wherein the central control unit is configured to at least one of store the fault in a memory unit of the central control unit, output the fault to a display device and take a fault-specific emergency measure.

5. The device according to claim 1, wherein the peripheral unit includes a sensor configured to determine a state of the peripheral unit.

6. The device according to claim 5, wherein the sensor is configured to determine whether a preselectable temperature of an element of the peripheral unit has been exceeded.

7. The device according to claim 1, wherein the peripheral unit includes a signal edge-forming element, the signal edge-forming element configured to represent the digital diagnostic signals as one of positive and negative signal edges.

8. The device according to claim 1, further comprising one of at least one logic operations block and at least one open-collector circuit arranged so that the diagnostic signals are sendable from a group of a preselectable number of peripheral units first to one the at least one logic operations block and at least one open-collector circuit and linked together there to form a diagnostic group signal in a proper chronological order, the diagnostic group signal sendable thereafter to the central control unit.

9. The device according to claim 1, wherein the central control unit includes a separate time processing unit configured to determine for analysis the at least one first time difference may be between the activation signals and the diagnostic signals and the at least one second time difference between the diagnostic signals.

10. A method of ignition of an internal combustion engine including at least one cylinder, comprising the steps of:

sending digital control signals from a central control unit to at least one peripheral unit, each peripheral unit corresponding to a respective cylinder, each peripheral unit including a first comparator, a second comparator and a third comparator configured to generate diagnostic signals;

triggering ignition in the respective cylinder of the peripheral unit;

determining in the peripheral unit measured values representing states in the peripheral unit;

sending digital diagnostic signals to the central unit as a function of the measured values;

determining by the central control unit at least one first time difference between the control signals and the diagnostic signals for analysis of the diagnostic signals;

determining by the central control unit at least one second time difference between the diagnostic signals for analysis of the diagnostic signals;

determining by the first comparator whether a primary current has exceeded a preselectable first threshold;

determining by the second comparator whether a primary voltage has exceeded a preselectable second threshold; and determining by the third comparator whether the primary voltage has dropped below a preselectable third threshold.

11. The method according to claim 10, further comprising the step of comparing by the central control unit at least one of the first time difference and the second time difference with one of setpoint values and setpoint intervals.

12. The method according to claim 11, further comprising the step of detecting by the central control unit a fault in the ignition device in accordance with the comparing step.

13. The method according to claim 12, further comprising at least one of the steps of storing the fault in a memory unit of the central control unit, outputting the fault on a display unit and taking a fault-specific emergency measure.

14. The method according to claim 10, further comprising the step of determining by at least one sensor states of the peripheral unit.

15. The method according to claim 14, further comprising the step of determining by the sensor whether a preselectable temperature of an element of the peripheral unit is exceeded.

16. The method according to claim 10, further comprising the step of generating the digital diagnostic signals as one of positive and negative signal edges by a signal edge-forming element of the peripheral unit.

17. The method according to claim 10, further comprising the steps of:

arranging one of at least one logic operations block and at least one open-collector circuit so that diagnostic signals from one group of a preselectable number of peripheral units are sent first to the one of the logic operations block and the open-collector circuit; and linking together the diagnostic signals in a correct chronological order to form a diagnostic group signal; and then sending the diagnostic group signal to the central control unit.

18. The method according to claim 10, further comprising the step of determining by a time processing unit separate from the central control unit at least one of at least one time difference between activation signals and the diagnostic signals and at least one time difference between the diagnostic signals.

19. The method according to claim 16, further comprising the steps of:

generating a first signal edge as the diagnostic signal by the signal edge-forming element if the first comparator determines that the primary current exceeds a first threshold; and generating a second signal edge as the diagnostic signal if a shutoff signal edge as the activation signal reaches the peripheral unit.

20. The method according to claim 19, further comprising the step of generating a second signal edge as the diagnostic signal by the signal edge-forming element if a first sensor determines that a preselectable temperature of an element of the at least one peripheral unit has been exceeded.

21. The method according to claim 16, further comprising the steps of:

generating a first signal edge as the diagnostic signal by the signal edge-forming element if the second comparator determines that the primary voltage has exceeded the second threshold; and generating a second signal edge as the diagnostic signal by the signal edge-forming element if the third comparator determines that the primary voltage drops below the third threshold.

22. The method according to claim 18, further comprising the step of comparing at least one time difference with a respective time difference of a preceding combustion cycle of a same cylinder as a setpoint value.

23. The method according to claim 22, further comprising the steps of:

determining limits of the setpoint values by model calculations as a function of internal combustion engine parameters; and storing the setpoint values in a memory unit of the central control unit.

24. The method according to claim 23, wherein the internal combustion engine parameter includes a battery voltage.

25. The method according to claim 23, further comprising the step of determining the limits of the setpoint intervals by a statistical method on the basis of prevailing time differences during internal combustion engine operating time.

26. The method according to claim 10, further comprising the steps of:

identifying as a turn-on time a time difference between a turn-on signal edge of the activation signal for a respective cylinder and a first charging signal edge of one of the diagnostic signal and a diagnostic group signal;

determining whether the turn-on time is within a certain first setpoint interval;

identifying one of a fault in the diagnostic system and a line drop-out in the ignition system as a fault in the ignition device if the turn-on time is zero;

identifying one of a short circuit to a battery voltage and a turn-to-turn fault in a respective ignition coil as a fault if the turn-on time is less than a minimum value of the first setpoint interval; and identifying a high-resistance ignition circuit as a fault if the turn-on time is greater than a maximum value of the first setpoint interval.

27. The method according to claim 10, further comprising the steps of:

identifying as a charging time a time difference between a first charging signal edge and a second charging signal edge of one of the diagnostic signal and a diagnostic group signal for a respective cylinder;

determining whether the charging time is within a second setpoint interval;

identifying a loose contact in the peripheral unit as a fault if the charging time is less than a minimum value of the second setpoint interval; and identifying a fault in the central control unit if the charging time is greater than a maximum value of the second setpoint interval.

28. The method according to claim 27, further comprising the step of triggering ignition by the central control unit if the charging time is greater than a maximum value of the second setpoint interval.

29. The method according to claim 27, further comprising the steps of:

identifying as a charging time a time difference between a first charging signal edge of one of the diagnostic signal and a diagnostic group signal for the respective cylinder and a second excess temperature shutoff signal edge for the respective cylinder if the second excess temperature shutoff signal edge occurs before one of a second charging signal edge and a shutoff signal edge;

identifying as a fault one of an excess temperature shutdown and a loose contact in the peripheral unit if the charging time is less than a minimum value of the second setpoint interval; and determining the loose contact to be a more likely fault if a further charging time is ascertained within the second setpoint interval.

30. The method according to claim 10, further comprising the steps of:

identifying as a rise time a time difference between an activation signal edge of an activation signal and a first voltage signal edge of one of the diagnostic signal and a diagnostic group signal for the respective a cylinder; and determining whether the rise time is less than a third setpoint value.

31. The method according to claim 30, further comprising the steps of:

identifying as an ignition time a time difference between a first voltage signal edge and a second voltage signal edge of one of the diagnostic signal and a diagnostic group signal for the respective cylinder;

determining whether the ignition time is less than a fourth setpoint value;

determining that ignition has taken place if the ignition time is less than the fourth setpoint value and the rise time is less than the third setpoint value; and determining that ignition has not taken place if the ignition time is greater than the fourth setpoint value and the rise time is less than the third setpoint value.

* * * * *